United States Patent
Seo

(10) Patent No.: US 7,336,574 B2
(45) Date of Patent: Feb. 26, 2008

(54) APPARATUS FOR DETECTING ABNORMAL STATES OF LASER DIODE POWER IN AN OPTICAL DISC RECORDING/REPRODUCING DEVICE

(75) Inventor: Jin-gyo Seo, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 65 days.

(21) Appl. No.: 11/221,926

(22) Filed: Sep. 9, 2005

(65) Prior Publication Data

US 2006/0002268 A1  Jan. 5, 2006

Related U.S. Application Data

(63) Continuation of application No. 10/173,978, filed on Jun. 19, 2002, now Pat. No. 6,956,803.

(30) Foreign Application Priority Data

Jul. 20, 2001 (KR) .............................. 2001-43786

(51) Int. Cl.
G11B 7/00 (2006.01)
(52) U.S. Cl. ................. 369/47.35; 369/53.26
(58) Field of Classification Search ...................... None
See application file for complete search history.

(56) References Cited

U.S. PATENT DOCUMENTS

| | | | |
|---|---|---|---|
| 4,507,767 A | 3/1985 | Takasugi | |
| 4,685,097 A | 8/1987 | van der Put | |
| 4,750,163 A | 6/1988 | Yamamiya et al. | |
| 5,046,158 A * | 9/1991 | Groen | 341/137 |
| 5,126,993 A | 6/1992 | Yokota | |
| 5,151,893 A | 9/1992 | Yamasaki et al. | |
| 5,170,389 A | 12/1992 | Numata et al. | |
| 5,251,199 A | 10/1993 | Utsumi et al. | |
| 5,262,680 A | 11/1993 | Hu | |
| 5,640,381 A * | 6/1997 | Call et al. | 369/47.52 |
| 6,167,010 A | 12/2000 | Shimada et al. | |
| 6,359,847 B1 * | 3/2002 | Shimizu | 369/53.26 |

(Continued)

FOREIGN PATENT DOCUMENTS

JP      58-20045      11/1983

(Continued)

OTHER PUBLICATIONS

Taiwanese Office Action issued in Taiwan App. No. 091102780 Oct. 11, 2005.

Primary Examiner—William R. Korzuch
Assistant Examiner—Peter Vincent Agustin
(74) Attorney, Agent, or Firm—Staas & Halsey LLP

(57) ABSTRACT

An apparatus for detecting abnormal states which prevents damage to a laser diode or data recorded on a disc and swiftly correcting the abnormal state. An overflow/underflow detector detects whether overflow or underflow of the laser diode occurs, by comparing a laser diode output power control value, which is output from the laser diode output power control circuit, with an overflow setting value and an underflow setting value. A mode switch switches an operation mode of the laser diode output power control circuit from a recording mode to a reproducing mode, in response to the detection result of the overflow/underflow detector.

2 Claims, 6 Drawing Sheets

U.S. PATENT DOCUMENTS 6,831,883 B1 * 12/2004 Yamada et al. .......... 369/47.16
2002/0039339 A1 * 4/2002 Shiozaki et al. ......... 369/53.27

FOREIGN PATENT DOCUMENTS

| | | |
|---|---|---|
| JP | 62-66431 | 3/1987 |
| JP | 2-13757 | 1/1990 |
| JP | 9-63093 | 3/1997 |
| JP | 9-120137 | 4/1997 |
| JP | 9-231666 | 9/1997 |
| JP | 2000-339736 | 8/2000 |
| TW | 169758 | 9/1991 |

* cited by examiner

APPARATUS FOR DETECTING ABNORMAL STATES OF LASER DIODE POWER IN AN OPTICAL DISC RECORDING/REPRODUCING DEVICE

CROSS REFERENCE TO RELATED APPLICATIONS

This application is a continuation of Ser. No. 10/173,978 filed Jun. 19, 2002, now U.S. Pat. No. 6,956,803. This application claims the benefit of Korean Application No. 2001-43786 filed Jul. 20, 2001, in the Korean Patent Office, the disclosure of which is incorporated herein by reference.

BACKGROUND OF THE INVENTION

1. Field of the Invention

The present invention relates to an apparatus for detecting abnormal states of an optical disc recording/reproducing apparatus, and more particularly, to an apparatus for detecting abnormal states, which can swiftly prevent damage to a laser diode and data recorded on a disc.

2. Description of the Related Art

An optical disc recording/reproducing apparatus is an apparatus which applies laser light generated in a laser diode to a recording area so that data is recorded or reproduced. During recording and/or reproduction, the laser light generated in the laser diode should maintain an appropriate output with respect to operation modes.

An apparatus for controlling a laser diode output must accurately maintain the output of the laser diode in response to the operation modes of the laser diode, and changes in input and output characteristics. The apparatus detects the output of the laser diode by a monitor diode, and controls the output of the laser diode by comparing the detected output with a desired value.

If overflow or underflow occurs in the output of the laser diode, the laser diode may be damaged or data may be incorrectly recorded or lost. Therefore, to prevent the overflow condition or the underflow condition, a circuit for detecting abnormal states is provided.

FIG. 1 is a block diagram of a prior art apparatus for detecting abnormal states.

The apparatus of FIG. 1 includes a first comparator 112 which detects overflow, a second comparator 114 which detects underflow, and a microprocessor 120 which provides overflow and underflow setting values to the first and second comparators 112 and 114, respectively.

A monitor PD & current/voltage (I/V) converter 102 detects an output level of a laser diode 110. The output level detected by the monitor PD & current/voltage converter 102 is amplified in a variable gain amplifier 104. The amplification degree of the variable gain amplifier 104 changes depending on the operation modes (reproducing/recording) of the optical recording/reproducing apparatus and whether the recording/reproduction apparatus is currently accessing tracks/grooves.

The output of the variable gain amplifier 104 is provided to an APC block 106. The APC block 106 compares an input provided by the variable gain amplifier 104, that is, the current output of the laser diode, with a reference value, and controls the output of the laser diode 110 according to a result of the comparison.

The output of the APC block 106 is provided to the laser diode 110 through a Digital/Analog Converter (DAC) 108, to control the output of the laser diode 110.

In the apparatus shown in FIG. 1, if the output of the laser diode 100 is too high (overflow), the laser diode 110 may be damaged and data recorded on the disc (not shown) during recording may be damaged; and in reproducing, recorded data may deteriorate to affect recording quality or recorded data may be damaged to be unreproducible.

Meanwhile, if the output of the laser diode 110 is too low (underflow), a normal reproducing signal from a pick-up (not shown) is not obtained, and the APC block 106 does not sense the output level of the laser diode 110, so the output level is not controlled.

To prevent deteriorating recording quality and damaging recorded data, a circuit for detecting abnormal states detects a state in which the output of the laser diode 110 is too high (overflow) or too low (underflow), so that appropriate measures are taken.

In the apparatus of FIG. 1, the first comparator 112 detects overflow by comparing the output of the variable gain amplifier 104, that is, the current output level of the laser diode 110, with an overflow setting value, and generates a signal which indicates an occurrence of overflow according to a result of the comparison.

Meanwhile, the second comparator 114 detects underflow by comparing the output of the variable gain amplifier 104, that is, the current output level of the laser diode 110, with an underflow setting value, and generates a signal which indicates an occurrence of underflow according to a result of the comparison.

The microprocessor 120 monitors the states of the overflow signal generated in the first comparator 112 and the underflow signal generated in the second comparator 114, recognizes whether an abnormal state occurs, and if an abnormal state occurs, takes appropriate measures.

However, because the microprocessor 120 monitors whether overflow and underflow occur and performs operations for coping with abnormal states, the prior art apparatus for detecting abnormal states of FIG. 1 does not avoid delays due to processing by the microprocessor. That is, the microprocessor recognizes the occurrence of overflow and underflow by an interrupt signal, and spends time processing the interrupt. Therefore, due to the delay time for processing the interrupt, the microprocessor does not swiftly take measures to protect the laser diode or data recorded on the disc. In addition, in an optical disc recording/reproducing apparatus having a large capacity or high speed, data recorded on a disc or a laser diode in the apparatus is more vulnerable to damage due to the delay time.

SUMMARY OF THE INVENTION

To solve the above problems, it is an object of the present invention to provide an improved apparatus for detecting abnormal states which prevents delay time due to processing by a microprocessor so that a laser diode and data recorded on a disc are efficiently protected.

Additional objects and advantages of the invention will be set forth in part in the description which follows, and, in part, will be obvious from the description, or may be learned by practice of the invention.

To accomplish the above and other objects of the present invention, there is provided an apparatus for detecting abnormal states of an optical disc recording/reproducing device comprising: a laser diode output power control circuit which controls the output of a laser diode depending on the laser diode, and recording and reproducing modes; an overflow/underflow detector which detects whether overflow or underflow of the laser diode occurs, by comparing a laser diode output power control value, which is output from the laser diode output power control circuit, with an overflow setting value and an underflow setting value; and a mode switch which switches an operation mode of the laser diode output power control circuit from a recording mode to a reproducing mode, in response to the detection result of the overflow/underflow detector.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
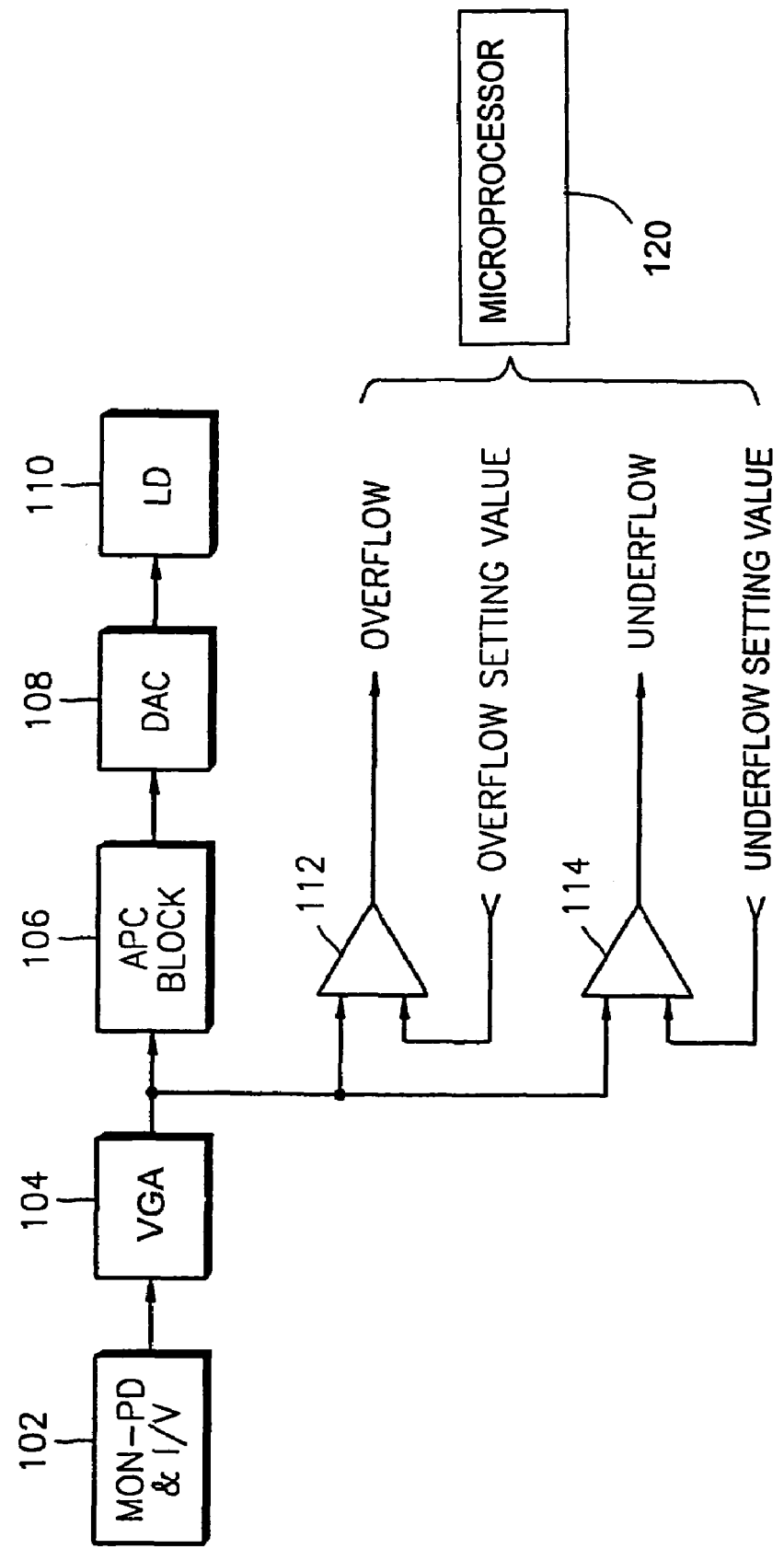
FIG. 1 is a block diagram of a conventional apparatus for detecting abnormal states of laser diode power.

Reference will now be made in detail to the present embodiments of the present invention, examples of which are illustrated in the accompanying drawings, wherein like reference numerals refer to like elements throughout.

Figure 2:
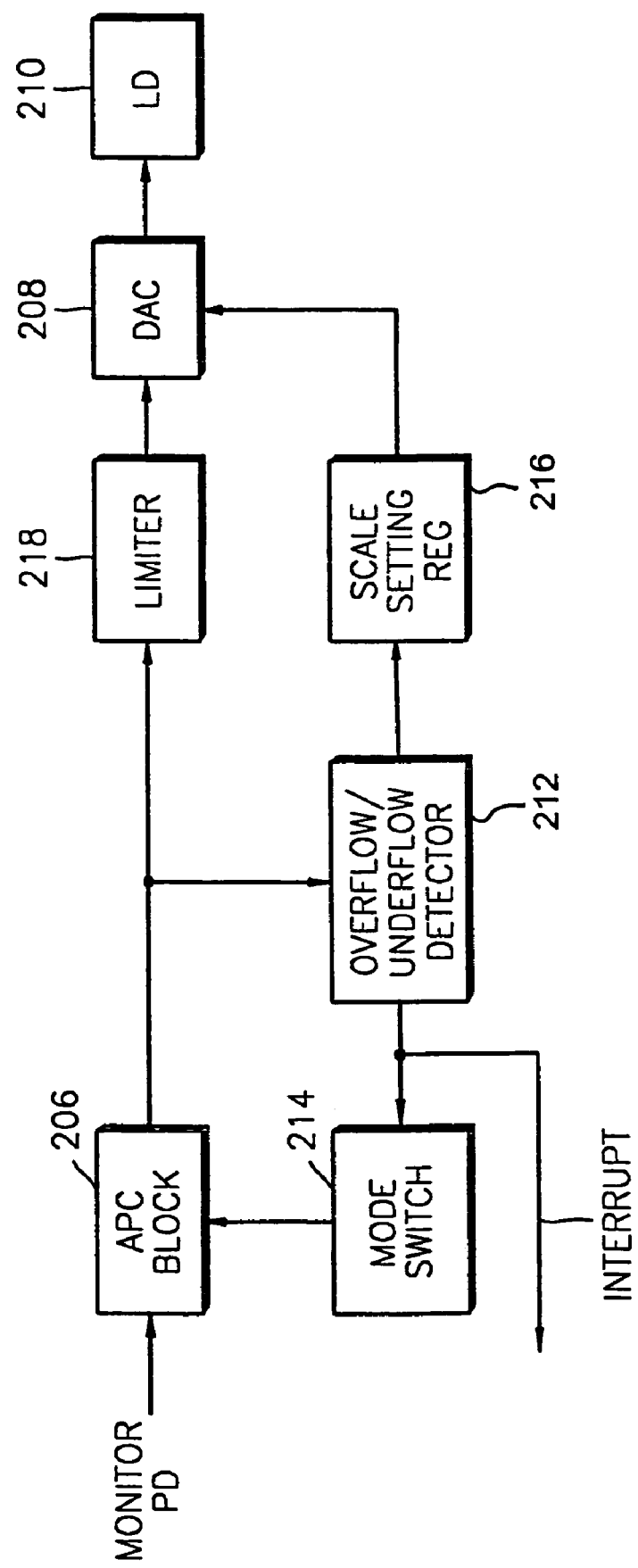
FIG. 2 is a block diagram an apparatus for detecting abnormal states of laser diode power according to an embodiment of the present invention.

The apparatus for detecting abnormal states of laser diode power of FIG. 2 comprises an overflow/underflow detector 212 which detects overflow and/or underflow using an output control value which is output from an Automatic diode output Power Control (APC) block 206 and applied to a laser diode 210, a mode switch 214 which switches operation modes of the APC block 206 by control of the overflow/underflow detector 212, a scale setting register 216 which scales the output control value which is output from the APC block 206 and applied to the laser diode 210, and a limiter 218 which limits the output control value, which is output from the APC block 206 and applied to the laser diode 210, with a predetermined limit value.

The operation of the apparatus of FIG. 2 will now be explained in detail.

The output of the APC block 206 is provided to the overflow/underflow detector 212. The overflow/underflow detector 212 determines an occurrence of overflow or underflow, by comparing the output from the APC block 206, that is, the output control value of the laser diode 210, with overflow/underflow setting values. According to the comparison result, the overflow/underflow detector 212 generates an overflow signal or an underflow signal which indicates the occurrence of overflow or underflow.

The detection result of the overflow/underflow 212 is provided to the mode switch 214. The mode switch 214 switches the operation mode of the APC block 206 from a recording mode to a reproducing mode in response to the detection result.

Figure 3:
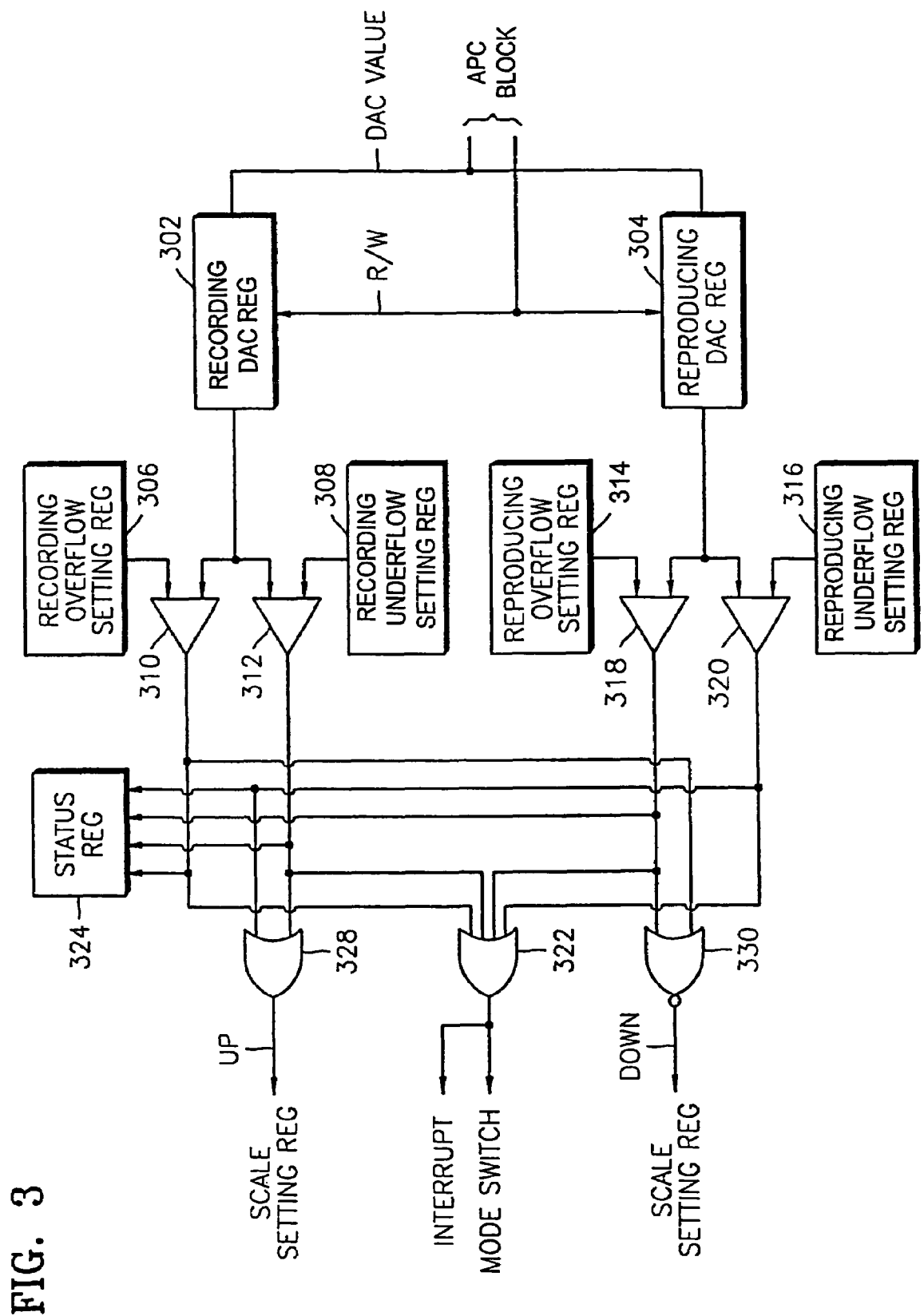
FIG. 3 is a detailed block diagram of an overflow/underflow detector shown in FIG. 2.

Meanwhile, when overflow or underflow occurs, the overflow/underflow detector 212 generates an interrupt signal which indicates the occurrence of overflow/underflow to the microprocessor (not shown), and stores the current occurrence state of overflow or underflow to an internal status register (see FIG. 3). The stored content of the status register is referred to by the microprocessor (not shown).

Meanwhile, an output of the overflow/underflow detector 212 is provided to the scale setting register 216. In response to the detection result of the overflow/underflow detector 212, the scale setting register 216 changes a scale of a Digital to Analog Converter (DAC) 208.

When underflow occurs, as determined by an appropriate signal from an optical pickup (not shown), the output control value provided to the laser diode 210 is increased by operation of the scale setting register 216 on the DAC 208, and the output of the laser diode 210 increases. When overflow occurs, the output control value of the laser diode 210 is decreased by operation of the scale setting register 216 on the DAC 208, to prevent possible damage to the laser diode 210.

The output control value output from the APC block 206 is provided to the laser diode 210 through the limiter 218 and the DAC 208. If the output control value output from the APC block 206 exceeds a top limit value or becomes less than a bottom limit value, the limiter 218 limits the output control value within the top limit value and the bottom limit value and outputs the limited output control value.

The APC block 206 comprises an up/down counter (not shown) which provides the output control value. If laser power becomes less than a minimum value, the output of the up/down counter is increased to maintain the laser power adequately. Conversely, if laser power exceeds a maximum value, the up/down counter is decreased. The output of the up/down counter is provided to the DAC 208 through the limiter 218.

The limiter 218 sets a dynamic range of the DAC 208 to protect the laser diode 210. Although a rating of the DAC 208 is determined at a time of design, a rating of the laser diode 210 to be adapted may vary. To meet a variance of the laser diode rating and a margin, the rating of the DAC 208 is superior to the rating of the laser diode 210. Thus, the limiter 218 is used to set a dynamic range, i.e., upper and lower values of the DAC 208.

The scale setting register 216 is used to adjust a reference value of the DAC 208. For example, in an 8-bit DAC, the output value of the DAC is defined $R \times N/256$, where R is the reference value and N is 0, 1, 2, . . . 255. If higher speed recording or reproducing is required, a higher output of the laser diode is necessary. In such a case, the reference value of the DAC 208 is adjustable using an additional DAC or an up/down counter (not shown). The output of this additional DAC or up/down counter is provided as the reference value of the DAC 208.

FIG. 3 is a detailed block diagram of the overflow/underflow detector 212 shown in FIG. 2. The overflow/underflow detector 212 comprises a recording DAC register 302 for the recording mode, a reproducing DAC register 304 for the reproducing mode, a recording overflow setting register 306, a recording underflow setting register 308, a recording overflow comparator 310, a recording underflow comparator 312, a reproducing overflow setting register 314, a reproducing underflow setting register 316, a reproducing overflow comparator 318, a reproducing underflow comparator 320, OR gates 322 and 328, a NOR gate 330, and a status register 324.

The recording DAC register 302 and the reproducing DAC register 304 latch the outputs of the APC block 206 in the recording mode and in the reproducing mode, respectively.

The recording overflow setting register 306 and the recording underflow setting register 308 store the overflow setting value and the underflow setting value, respectively, in the recording mode.

The recording overflow comparator 310 compares the output control value with the recording overflow setting value set in the recording overflow setting register 306 and generates an overflow signal according to the comparison result. The recording underflow comparator 312 compares the output control value with the recording underflow setting value set in the recording underflow setting register 308 and generates an underflow signal according to the comparison result.

Meanwhile, the reproducing overflow setting register 314 and the reproducing underflow setting register 316 store the overflow setting value and the underflow setting value, respectively, in the reproducing mode.

The reproducing overflow comparator 318 compares the output control value with the reproducing overflow setting value set in the reproducing overflow setting register 314 and generates an overflow signal according to the comparison result. The reproducing underflow comparator 320 compares the output control value with the reproducing underflow setting value set in the reproducing underflow setting register 316 and generates an underflow signal according to the comparison result.

The OR gate 322 performs an OR operation on the recording overflow signal generated in the recording overflow comparator 310, the recording underflow signal generated in the recording underflow comparator 312, the reproducing overflow signal generated in the reproducing overflow comparator 318, and the reproducing underflow signal generated in the reproducing underflow comparator 320. The OR gate 322 provides the result of the OR operation to the mode switch 214 of FIG. 2, and outputs the result as an interrupt signal to the microprocessor (not shown).

Meanwhile, the status register 324 stores current states of the recording overflow signal generated in the recording overflow comparator 310, the recording underflow signal generated in the recording underflow comparator 312, the reproducing overflow signal generated in the reproducing overflow comparator 318, and the reproducing underflow signal generated in the reproducing underflow comparator 320.

If the interrupt signal occurs, the microprocessor (not shown) analyzes a cause of the interrupt by referring to the current states stored in the status register 324, and takes appropriate measures.

The OR gate 328 generates an UP signal, which is provided to the scale setting register 216 of FIG. 2, when overflow occurs. Meanwhile, NOR gate 330 generates a DOWN signal, which is provided to the scale setting register 216 of FIG. 2, when underflow occurs. The scale setting register 216 performs a scale-up or scale-down operation according to the UP signal generated by the OR gate 328 or the DOWN signal generated by the NOR gate 330, respectively.

Figure 4:
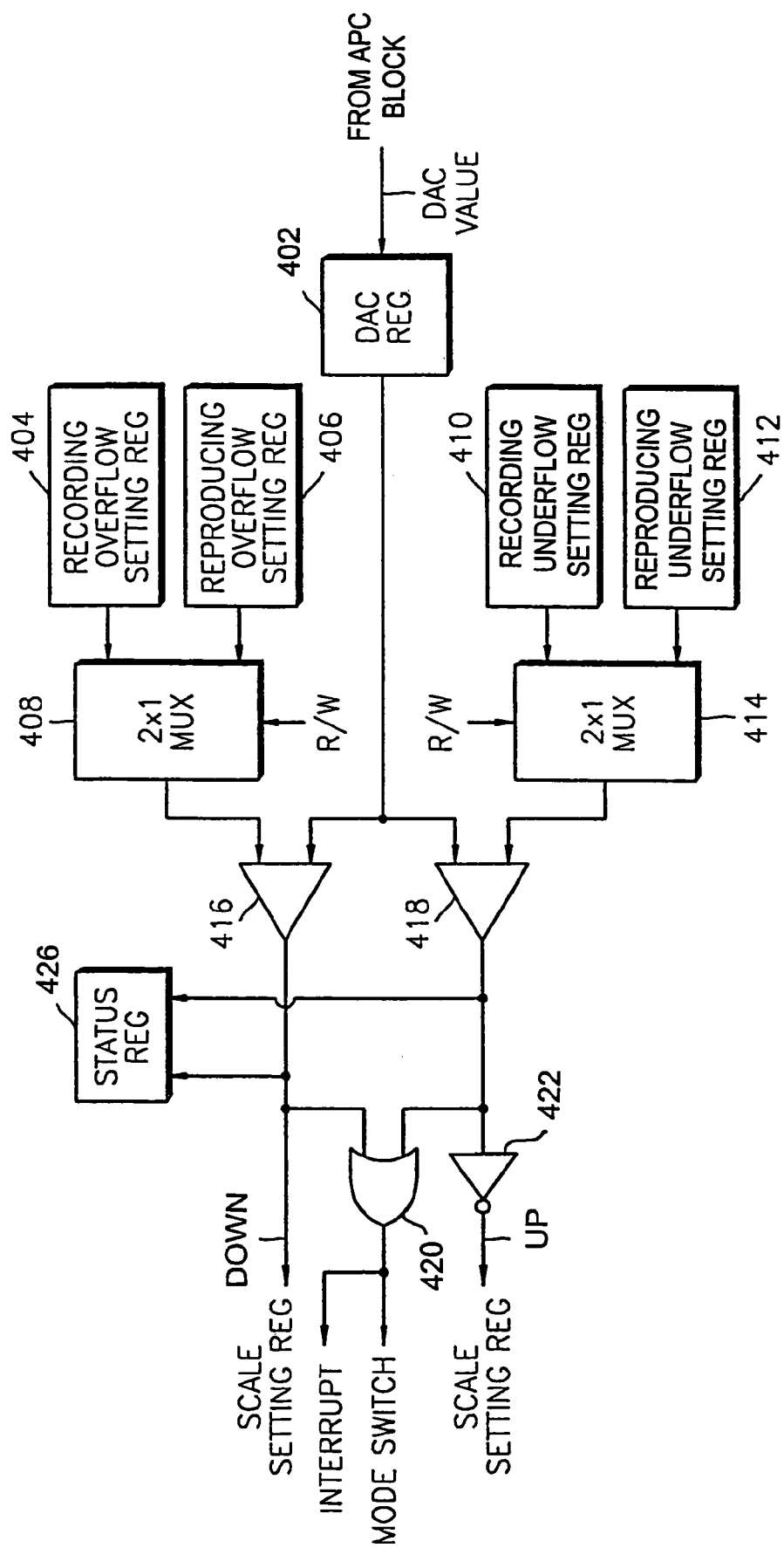
FIG. 4 is a block diagram of another implementation of the overflow/underflow detector shown in FIG. 2.

FIG. 4 is a block diagram of another embodiment of the overflow/underflow detector shown in FIG. 2.

The detector of FIG. 4 comprises a DAC register 402, a recording overflow setting register 404, a reproducing overflow setting register 406, a first multiplexer 408, a recording underflow setting register 410, a reproducing underflow setting register 412, and a second multiplexer 414.

The first multiplexer 408 and the second multiplexer 414 determine selection operations according to a mode signal R/W. That is, if the mode signal indicates the recording (write) mode (W), the first multiplexer 408 selects the output of the recording overflow setting register 404 and outputs the selected signal, and the second multiplexer 414 selects the output of the recording underflow setting register 410 and outputs the selected signal. If the mode signal indicates the reproducing (read) mode, the first multiplexer 408 selects the output of the reproducing overflow setting register 406 and outputs the selected signal, and the second multiplexer 414 selects the output of the reproducing underflow setting register 412 and outputs the selected signal. The mode signal is provided by the automatic laser diode output control block 206, or by the microprocessor (not shown) for controlling an optical recording/reproducing apparatus having the apparatus of FIG. 2

The overflow comparator 416, the underflow comparator 418, and the OR gate 420 detect abnormal states. Meanwhile, the outputs of the overflow comparator 416 and the underflow comparator 418 are applied to the scale setting register 216 as a DOWN signal and an UP signal, respectively, the output of the underflow comparator 418 being inverted by an inverter 422.

Meanwhile, the status register 426 stores current states of the overflow comparator 416 and the underflow comparator 418. As in the embodiment of FIG. 3, if the interrupt signal occurs, the microprocessor (not shown) analyzes a cause of the interrupt by referring to the current states stored in the status register 426, and takes appropriate measures.

In the embodiments of the overflow/under flow detector shown in FIGS. 3 and 4, the values set in the overflow setting register and the underflow setting register may be provided by an external apparatus such as a microprocessor. Where the underflow and overflow register values are externally provided, the overflow/underflow detectors of FIGS. 3 and 4 further comprise input ports which receive the values set by the external apparatus, data lines and a path controller which loads the input values to the overflow setting register or the underflow setting register.

Figure 5:
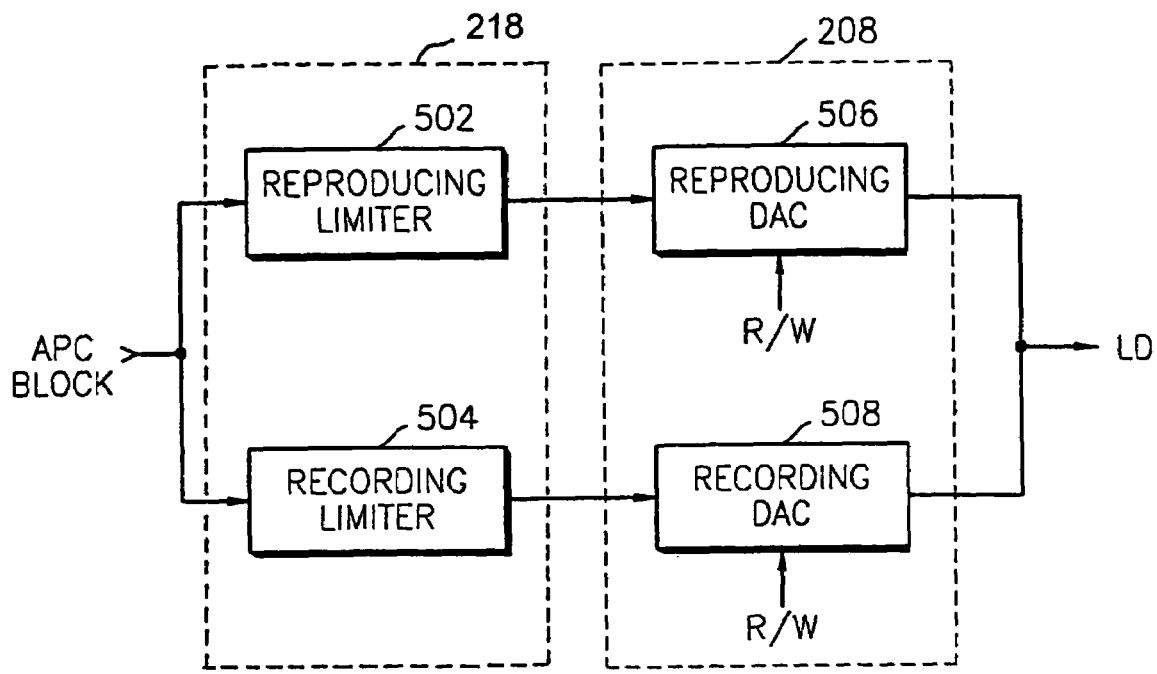
FIG. 5 is a detailed block diagram of the limiter shown in FIG. 2.

FIG. 5 is a detailed block diagram of the limiter 218 shown in FIG. 2 and shown connected with the DAC 208 shown in FIG. 2. The limiter 218 further comprises a reproducing limiter 502 and a recording limiter 504 which connect with a reproducing DAC 506 and a recording DAC 508, respectively. The reproducing DAC 506 and the recording DAC 508 comprise the DAC 208 as shown in FIG. 2.

The reproducing limiter 502 limits the control value provided by the APC block 206 within a predetermined range of values, in the reproducing mode. That is, in the reproducing mode, if the control value provided by the APC block 206 is less than the bottom limit value, the reproducing limiter 502 outputs the bottom limit value to the DAC 208, and if the control value provided by the APC block 206 is greater than the top limit value, outputs the top limit value. Such operation of the reproducing limiter 502 is referred to as a core function.

That is, if in the reproducing mode, a control value between the bottom limit value and the top limit value inclusive is input, the reproducing limiter 502 outputs the control value without modification, while if the control value is less than the bottom limit value, the reproducing limiter 502 modifies the control value to equal the bottom limit value and outputs the bottom limit value to the DAC 208 as the control value, and if the control value is greater than top limit value, the reproducing limiter 502 modifies the control value to equal the top limit value and outputs the top limit value to the DAC 208 as the control value.

In reproducing data from a disc, if the output of the laser diode 210 falls below a predetermined limit, the level of a reproducing signal output from the optical pick-up (not shown) becomes too low to normally reproduce the data from the disc. Meanwhile, if the output of the laser diode 210 increases over a predetermined level, data recorded on the disc deteriorates, and if the increased level is repeated, the data recorded on the disc deteriorates such that the data is not again reproducible. Therefore, in reproducing, an operation for maintaining the output of the laser diode 210 within a predetermined range of values is needed, and the reproducing limiter 502 performs the operation.

The recording limiter 504 limits the control value provided by the APC block 206 within a predetermined range of values, in the recording mode. That is, in the recording mode, if the control value provided by the APC block 206 is less than the bottom limit value, the recording limiter 504 outputs the bottom limit value, and if the control value provided by the APC block 206 is greater than top limit value, the recording limiter 504 outputs the top limit value. Such operation of the recording limiter 504 is referred to as a core function. That is, if in the recording mode, a control value between the bottom limit value and the top limit value inclusive is input, the recording limiter 504 outputs the control value without modification, while if the control value is less than the bottom limit value, the recording limiter 504 modifies the control value to equal the bottom limit value and outputs the bottom limit value to the DAC 208 as the control value, and if the control value is greater than top limit value, the recording limiter 504 modifies the control value to the top limit value and outputs the top limit value to the DAC 208 as the control value. The DAC 208 outputs the control value to the LD 210 (FIG. 2) according to a mode control signal R/W, wherein R (read) corresponds to selecting the signal from the reproducing DAC 506 and W (write) corresponds to selecting the signal from the recording DAC 508.

In recording data on a disc, if the output of the laser diode 210 falls below a predetermined limit, recording data on the disc becomes impossible. Meanwhile, if the output of the laser diode 210 increases over a predetermined level, a recording film formed on the disc is damaged so that normal recording is not possible. Therefore, in recording, an operation for maintaining the output of the laser diode 210 within a predetermined range of values is needed, and the recording limiter 502 performs the operation.

Figure 6:
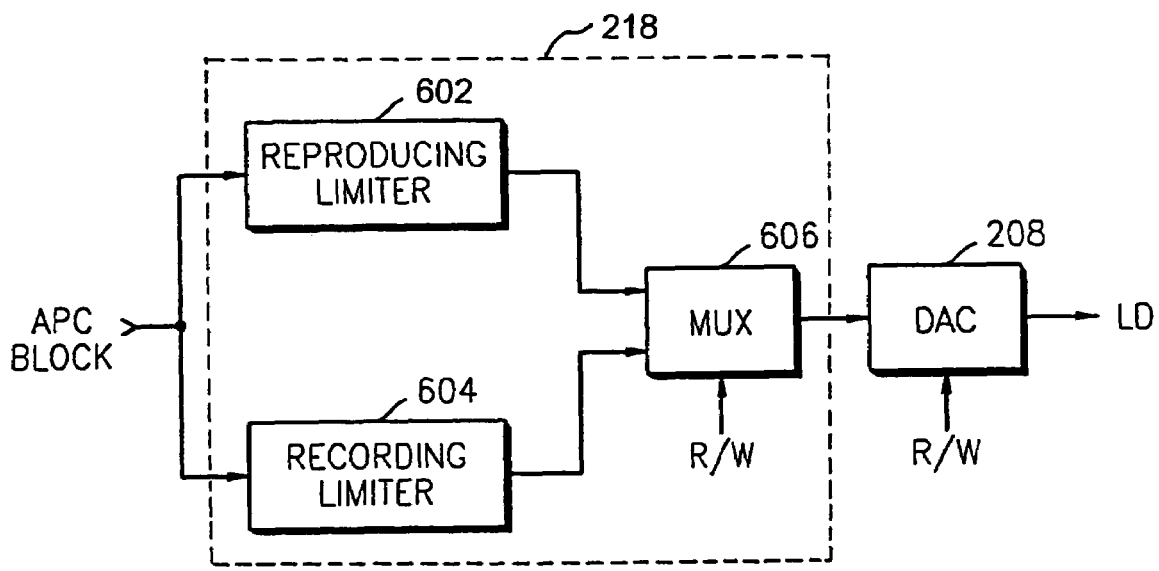
FIG. 6 is a block diagram of another implementation of the limiter shown in FIG. 2.

FIG. 6 is a block diagram of another embodiment of the limiter 218 shown in FIG. 2. In the embodiment shown in FIG. 6, the limiter 218 comprises a reproducing limiter 602, a recording limiter 604, and a multiplexer 606.

Here, the DAC 208 multiprocesses at high speed, and is used for both the recording mode and the reproducing mode. The operations of the reproducing limiter 602 and the recording limiter 604 in the limiter of FIG. 6 are the same as that of the reproducing limiter 502 and the recording limiter 504 of FIG. 5, respectively.

According to a mode signal R/W indicating the recording mode (W) or the reproducing mode (R), the multiplexer 606 selectively provides one of the output of the reproducing limiter 602 and the output of the recording limiter 604 to the DAC 208.

Figure 7:
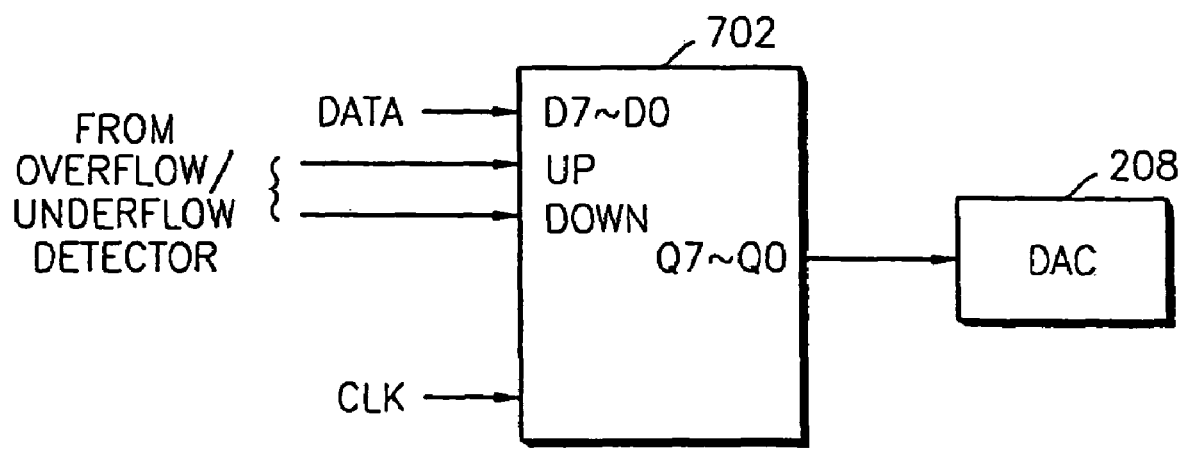
FIG. 7 is a detailed block diagram of the structure of the scale setting register shown in FIG. 2.

FIG. 7 is a detailed block diagram of the scale setting register 216 shown in FIG. 2. As shown in FIG. 7, the scale setting register is implemented using an up/down counter 702. The up/down counter 702 is set to a predetermined initial value according to externally supplied DATA, and counts down or up from the set value, according to the output of the overflow/underflow detector 212. A coefficient value of the up/down counter 702 is provided as a scale setting value or a scale factor of the DAC 208.

As described above, the apparatus for detecting abnormal states according to the present invention swiftly prevents overflow or underflow of the laser diode so that the apparatus prevents damage to the laser diode or damage to the data recorded on the disc.

Also, when an abnormal state occurs, without waiting for the operation of the microprocessor, the apparatus directly changes the operation mode of the automatic laser diode output power control block so that measures for correction of the abnormal state are swiftly taken.

In addition, the apparatus has the status register for storing the abnormal state so that the microprocessor can accurately find the cause of the abnormal state and take appropriate measures.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling a Digital/Analog Converter (DAC) for providing an output control value of a laser diode of an optical disc recording/reproducing device, the method comprising:

setting a reference value of the DAC according to a detected recording/reproducing speed of the optical disc recording/reproducing device;

detecting whether overflow or underflow of the laser diode output power occurs; and adjusting a scaling factor of the DAC, as the reference value, according to the result of the overflow or underflow detection.

2. A recording/reproducing apparatus for controlling an output of a laser diode of an optical disc recording/reproducing device, the apparatus comprising:

a Digital/Analog Converter (DAC) having an adjustable reference value for providing an output control value of the laser diode;

a reference value setting unit for setting the reference value of the DAC according to a detected recording/reproducing speed of the optical disc recording/reproducing device; an overflow/underflow detector which detects whether overflow or underflow of the laser diode output power occurs and outputs a detection result; and a scale setting register for adjusting a scaling factor, as the reference value, of the DAC according to the result of the overflow/underflow detector.

* * * * *